(12) United States Patent
Hood (10) Patent No.: US 9,728,789 B2
(45) Date of Patent: Aug. 8, 2017

(54) LAMINATED FUEL CELL ASSEMBLY (75) Inventor: Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 1234 days.

(21) Appl. No.: 13/578,677

(22) PCT Filed: Feb. 11, 2011

(86) PCT No.: PCT/GB2011/000191
§ 371 (c)(1),
(2), (4) Date: Jan. 9, 2013

(87) PCT Pub. No.: WO2011/104496
PCT Pub. Date: Sep. 1, 2011

(65) Prior Publication Data
US 2013/0149635 A1   Jun. 13, 2013

(30) Foreign Application Priority Data
Feb. 26, 2010 (GB) .................................. 1003281.1

(51) Int. Cl.
*H01M 8/00* (2016.01)
*B32B 39/00* (2006.01)
(Continued)

(52) U.S. Cl.
CPC ............... *H01M 8/00* (2013.01); *B32B 39/00* (2013.01); *H01M 8/1004* (2013.01);
(Continued)

(58) Field of Classification Search
None
See application file for complete search history.

(56) References Cited

U.S. PATENT DOCUMENTS

2003/0094242 A1   5/2003 Takeuchi et al.
2004/0168305 A1   9/2004 Schukar et al.
(Continued)

FOREIGN PATENT DOCUMENTS

| EP | 1 450 427 A1 | 8/2004 |
|----|----|----|
| JP | 2000-153316 | 6/2000 |
| JP | 2005-142048 | 2/2005 |

*Primary Examiner* — Barbara Gilliam
*Assistant Examiner* — Adam A Arciero
(74) *Attorney, Agent, or Firm* — Baker & Hostetler LLP (57) ABSTRACT

The disclosure, in some aspects, relates to a method and apparatus for assembling a laminated fuel cell, in which an assembly head comprising one or more punches is used for dividing portions from sheet material and for transferring the portions to an electrode plate for lamination. Embodiments disclosed include a method of assembling a laminated fuel cell, the method comprising the steps of: providing a first sheet material (202b) to a first die (205); translating an assembly head (204) to a first location adjacent the first die, the assembly head comprising a first punch (501) having a surface (507) configured to engage with the first die; engaging the first punch with the first die to divide a portion from the first sheet material; adhering the first sheet portion to the surface of the first punch; translating the assembly head with the first sheet material portion to an assembly station (203) comprising an electrode plate (701); and applying the first sheet material portion to a surface of the electrode plate.

9 Claims, 5 Drawing Sheets (51) Int. Cl.
  *H01M 8/1004* (2016.01)
  *B32B 38/18* (2006.01)
  *B32B 38/04* (2006.01)
  *H01M 8/0273* (2016.01)
  *H01M 8/1018* (2016.01)

(52) U.S. Cl.
  CPC ..... *B32B 38/1858* (2013.01); *B32B 2038/042* (2013.01); *B32B 2457/18* (2013.01); *H01M 8/0273* (2013.01); *H01M 2008/1095* (2013.01); *Y10T 29/53135* (2015.01)

(56) References Cited

U.S. PATENT DOCUMENTS

| | | |
|---|---|---|
| 2004/0173072 A1 | 9/2004 | Ishii et al. |
| 2005/0058878 A1 | 3/2005 | Huttenberger |
| 2005/0281981 A1 | 12/2005 | Puffer et al. |
| 2008/0145712 A1* | 6/2008 | Pierpont ............... B32B 37/203 429/509 |
| 2008/0311403 A1 | 12/2008 | Ripley et al. |
| 2009/0004543 A1* | 1/2009 | Jung ................... H01M 4/8605 429/406 |
| 2009/0255632 A1 | 10/2009 | Park |

\* cited by examiner

LAMINATED FUEL CELL ASSEMBLY

RELATED APPLICATION

This application claims the full Paris Convention Priority from, and is a U.S. National Stage entry of PCT/GB2011/000191 filed Feb. 11, 2011; which is based upon GB 1003281.1 filed Feb. 26, 2010, as if fully set forth herein in their entirety.

FIELD

The disclosure relates to a method and apparatus for assembling a laminated fuel cell, in which an assembly head comprising one or more punches is used for dividing portions from sheet material and for transferring the portions to an electrode plate for lamination.

BACKGROUND

Fuel cells based on proton exchange membrane technology are typically assembled by laminating together a large number of individual cells. Each cell comprises a membrane-electrode assembly (MEA) with associated anode and cathode plates on either side of the MEA. Gaskets are used to ensure a fluid-tight seal around the MEA.

Figure 1:
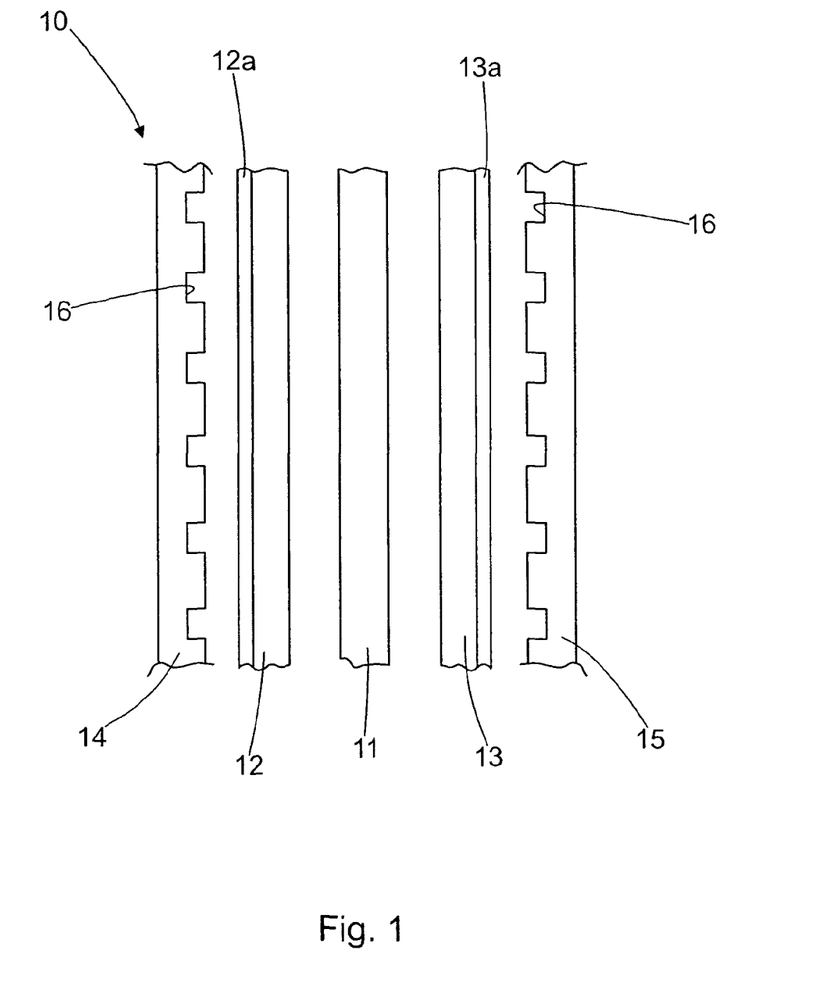
FIG. 1 is a schematic exploded cross-section of a polymer electrolyte membrane fuel cell.

A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to collectively as the membrane-electrode assembly.

Sandwiching the polymer membrane 11 and porous electrode layers 12, 13 is an anode fluid flow field plate 14 and a cathode fluid flow field plate 15. Intermediate backing layers 12a, 13a, also referred to as diffuser or gas diffusion layers, may also be employed between the anode fluid flow field plate 14 and the anode 12 and similarly between the cathode fluid flow field plate 15 and the cathode 13. The backing layers 12a, 13a are porous to allow diffusion of gas to and from the anode and cathode surfaces as well as assisting in the management of water vapour and liquid water in the cell.

The fluid flow field plates, or electrode plates, 14, 15 are formed from an electrically conductive, non-porous material by which electrical contact can be made to the respective anode electrode 12 or cathode electrode 13. At the same time, the fluid flow field plates facilitate the delivery and/or exhaust of fluid fuel, oxidant and/or reaction product to or from the porous electrodes 12, 13. This is conventionally effected by forming fluid flow passages in a surface of the fluid flow field plates, such as grooves or channels 16 in the surface presented to the porous electrodes 12, 13.

The electrode plates 14, 15 are electrically insulated from each other and the flow fields across the plates 14, 15 are kept fluid tight using gaskets that are positioned around the fluid field areas between the fluid flow plates and the polymer membrane 11.

To allow useful amounts of power to be generated, individual cells such as that shown in FIG. 1 need to be assembled into larger stacks of cells. This can be done by laminating multiple cells in a planar stack, resulting in alternating anode and cathode plate connections. Connecting individual cells in series allows for a higher voltage to be generated by the stack, and connecting cells or groups of cells in parallel allows for a higher current to be generated. Multiple stacks may be used to generate electrical power, for example for use in an electrical power unit for a hydrogen-powered vehicle.

Large numbers of cells need to be assembled to form each individual stack. Manufacturing such stacks therefore requires many separate steps, each of which requires accurate positioning of the various layers making up each cell. Any misalignment can result in failure of the entire stack, for example by an electrical short-circuit or through leakage from fuel or oxidant paths. It is therefore important for the application of fuel cell technology to mass production that a manufacturing process for assembling the stack is fast, accurate and reliable.

A particular problem with assembly of such fuel cell stacks relates to the accurate positioning and alignment of components such as gaskets, which by their nature are flexible and therefore more difficult to align with respect to other less flexible components such as the metallic fluid flow field plates, particularly when sub-millimeter location accuracy is required. Gaskets may be supplied in the form of die cut sheets of adhesive gasket material, which will require removal from a backing paper before being positioned in place on a substrate, for example on a fluid flow field plate or an MEA.

Accurately positioning such adhesive materials is difficult to achieve by hand without the aid of alignment tools, and is highly labour intensive.

The use of pre-cut sheets for the flexible components of the fuel cell assembly is also problematic because the sheets may be subject to movement and distortion during handling and assembly. The use of a backing paper, for example with adhesive layers such as gaskets, will tend to reduce distortion but may be insufficient to maintain repeatable sub-millimeter level accuracy of positioning of such gaskets.

A further problem is how to assemble a laminated fuel cell with as few operations as possible, to speed up the overall process and reduce the number of variables that may be subject to positioning tolerances.

A more general further problem is how to speed up the overall process of assembling a laminated fuel cell without sacrificing either accuracy or repeatability.

This disclosure and aspects of the embodiments herein address one or more of the above mentioned problems.

SUMMARY

In accordance with some aspects of the disclosure there is provided a method of assembling a laminated fuel cell, the method comprising the steps of, providing a first sheet material to a first die; translating an assembly head to a first location adjacent the first die, the assembly head comprising a first punch having a surface configured to engage with the first die; engaging the first punch with the first die to divide a portion from the first sheet material; adhering the first sheet portion to the surface of the first punch; translating the assembly head with the first sheet material portion to an assembly station comprising an electrode plate; and applying the first sheet material portion to a surface of the electrode plate.

In some instances, aspects of the disclosure provide the processes of cutting a sheet material and transferring the cut material to an electrode plate for lamination is carried out as part of a single process and using a single assembly head. This overcomes the aforementioned problem relating to movement and distortion during handling and assembly of pre-cut sheet materials. In some instances, the process may include reductions in direct and indirect assembly costs, as a result of punching and laminating operations being carried out within the same overall process.

The sheet portion may be adhered to the surface of the punch by a vacuum applied to openings in the surface of the punch. The use of a vacuum system for holding the sheet portion to the punch allows the sheet material to be firmly held to the assembly head during translation to the assembly station, and for the sheet material to be released after lamination to the electrode plate.

The assembly head may comprise a second punch having a surface configured to engage a second die, where the method comprises providing a second sheet material to the second die; translating the assembly head to a second location adjacent the second die; engaging the second punch with the second die to divide a portion from the second sheet material; translating the assembly head with the second sheet material portion to the assembly station; and applying the second sheet material portion to the surface of the electrode plate.

Having more than one punch on the assembly head reduces the number of operations that the apparatus is to perform, which speeds up the process.

As with the first sheet portion, the second sheet portion may be adhered to the surface of the second punch by a vacuum applied to openings in the surface of the second punch.

The assembly head may be translated from the second location to the assembly station with both the first and second sheet material portions adhered to respective surfaces of the first and second punches, and wherein the first and second sheet material portions are applied to the surface of the electrode plate in a single operation. This improves the relative positioning tolerance of the first and second sheet portions, as this is dictated by the positioning tolerance of the first and second punches rather than by the positioning tolerance of the assembly head relative to the assembly station.

In some exemplary implementations, an outer perimeter of the surface of the second punch lies entirely within an inner perimeter of the surface of the first punch. This is particularly relevant when the first sheet material comprises an adhesive gasket material and the second sheet material comprises a porous gas diffusion layer material, in that the gasket material will need to surround the gas diffusion layer material in the laminated fuel cell. This allows both sheet components to be carried on the assembly head at the same time, which removes one translation operation from the assembly process.

The first or second sheet materials may be provided to the first die by a linear sheet feeding line from a strip of the sheet material. The strip of sheet material may be provided from a reel. Because cutting of the sheet materials is carried out on the assembly apparatus, there is no need for the sheet materials to be supplied in a particular form other than a specified width and thickness to be compatible with the assembly process.

The electrode plate may be provided to the assembly station by a linear sheet feeding line comprising a series of linked electrode plates. The electrode plate, which may be an anode plate, may be provided in a pre-cut form with any required surface flow channels already in place.

The series of linked electrode plates may be indexed from the assembly station to a second assembly station after the operation of applying the first sheet material portion to the surface of the electrode plate. The second assembly station can then be used to perform other operations such as application of a further electrode plate, for example a cathode plate, while the first assembly station is provided with a fresh electrode plate for further sheet materials to be applied. Operations carried out at the second assembly station can therefore be carried out in parallel with subsequent operations carried out at the first assembly station, thereby speeding up the process further.

Where the assembly head is a first assembly head, the method may further comprise providing a third sheet material to a third die; translating a second assembly head to a third location adjacent a third die, the second assembly head comprising a first punch having a surface configured to engage with the third die; engaging the first punch of the second assembly head with the third die to divide a portion from the third sheet material; adhering the third sheet portion to the surface of the first punch of the second assembly head; translating the second assembly head with the third sheet material portion to the assembly station; and applying the first sheet material portion over the first and second sheet material portions.

Using a second assembly head, which may be substantially identical to the first assembly head, allows for some operations to be carried out in parallel. For example, the first and second assembly heads can be operated to translate to different cutting positions and obtain sheet material portions simultaneously, and then apply the sheet material portions over the electrode plate in sequence. This further speeds up the overall process.

As with the first and second sheet portions, the third sheet portion may be adhered to the surface of the first punch of the second assembly head by a vacuum applied to openings in the surface of the first punch of the second assembly head.

As with the first assembly head, the second assembly head may comprise a second punch having a surface configured to engage a fourth die, and the method may further comprise: providing a fourth sheet material to the fourth die; translating the second assembly head to a fourth location adjacent the fourth die; engaging the second punch of the second assembly head with the fourth die to divide a portion from the fourth sheet material; translating the second assembly head with the fourth sheet material portion to the assembly station; and applying the fourth sheet material portion over the first and second sheet material portions.

The third and fourth sheet material portions may, for example, be the gasket and gas diffusion layers for a cathode side of the fuel cell, where the first and second sheet material portions are the gasket and gas diffusion layers for an anode side of the fuel cell.

In some instances, the first assembly head may be used for cutting and translating each of the first, second third and fourth sheet material portions.

As with the other sheet portions, the fourth sheet portion may be adhered to the surface of the second punch of the second assembly head by a vacuum applied to openings in the surface of the second punch of the second assembly head.

The second assembly head may be translated from the fourth location to the assembly station with both the third and fourth sheet material portions adhered to respective surfaces of the first and second punches of the second assembly head, and the third and fourth sheet material portions applied over the first and second sheet material portions in a single operation.

The first assembly head may comprise a third punch configured to engage a fifth die at a fifth location, and the method may further comprise providing a fifth sheet material to the fifth die, translating the first assembly head to the fifth location, engaging the third punch with the fifth die to divide a portion from the fifth sheet material, translating the first assembly head with the fifth sheet material portion to the assembly station and applying the fifth sheet material portion over the first and second sheet material portions.

In some instances, a second assembly head may comprise a punch configured to engage a fifth die at a fifth location, the method comprising providing a fifth sheet material to the fifth die, translating the second assembly head to the fifth location, engaging the punch head of the second assembly head to divide a portion from the fifth sheet material, translating the second assembly head with the fifth sheet material portion to the assembly station and applying the fifth sheet material portion over the first and second sheet material portions.

The fifth sheet material portion preferably forms a membrane electrode assembly for the fuel cell assembly.

In some instances, there is provided an apparatus for assembling a laminated fuel cell, the apparatus comprising: a plurality of sheet feeding lines each configured to receive a sheet material for a layer of the fuel cell; an assembly station fed by one of the sheet feeding lines configured to index a series of linked electrode plates to the assembly station; a plurality of cutting stations fed by other ones of the plurality of sheet feeding lines, each cutting station comprising a die for defining a portion to be divided from a respective one of the sheet materials; an assembly head configured to be translatable between the assembly station and each of the cutting stations and comprising a first punch having a surface configured to engage with a corresponding die at a first one of the cutting positions, wherein the apparatus is configured to: translate the assembly head between the cutting stations and the assembly station; actuate the assembly head to divide a portion of sheet material from each of the sheet materials at the cutting stations; and transfer the divided portions from the cutting stations to the assembly station.

The assembly head may comprise a second punch having a surface configured to engage with a corresponding die at a second one of the cutting positions, an outer perimeter of the surface of the second punch being entirely within an inner perimeter of the surface of the first punch.

The surfaces of the first and second punches may comprise openings for applying a vacuum to cause sheet material divided by the respective punch to be adhered to the assembly head.

Aspects of one or more examples may also be applied to the others.

DRAWINGS

Aspects and embodiments of the disclosure are described in further detail below by way of examples and with reference to the enclosed drawings in which.

The conventional fuel cell configuration shown in FIG. 1 has been described above as part of the background art.

Figure 2:
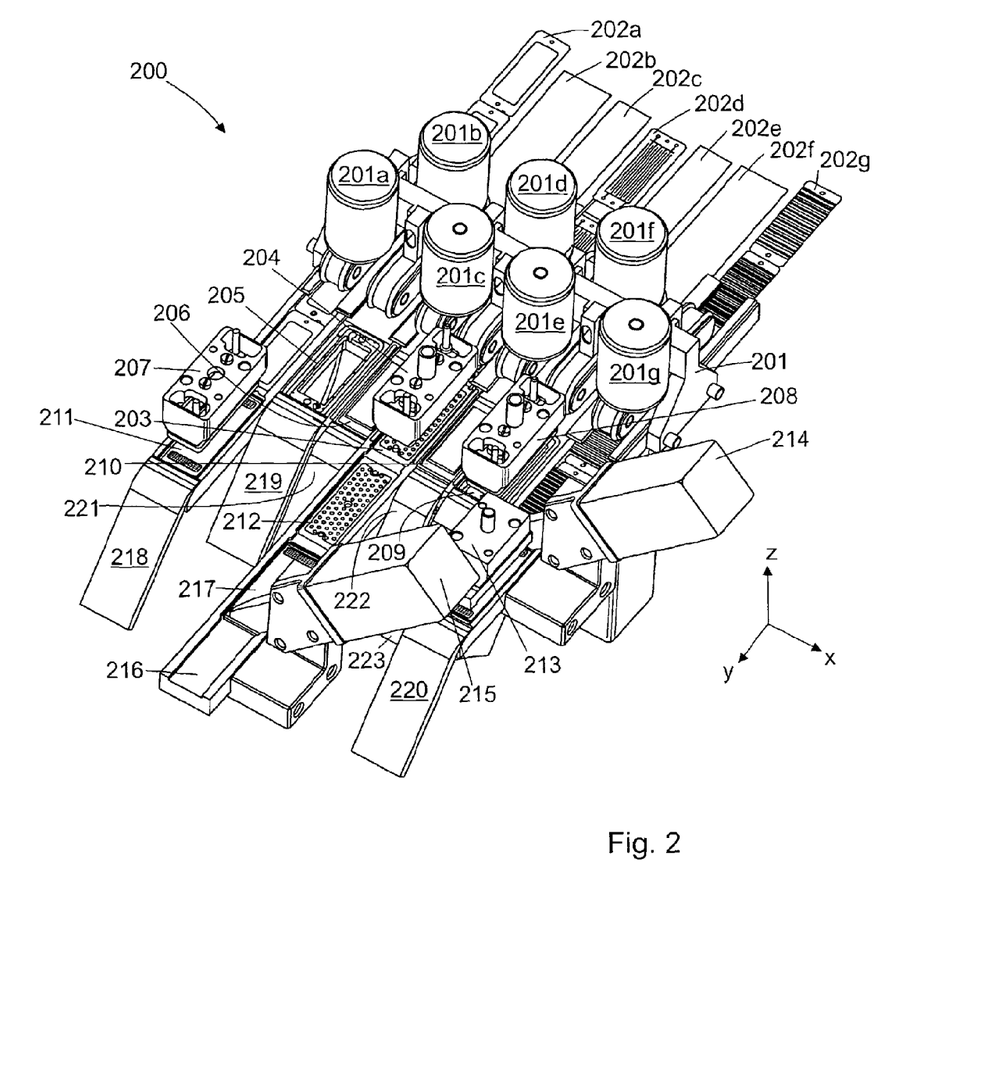
FIG. 2 is a perspective view of an exemplary apparatus for assembling a laminated fuel cell.
Figure 3:
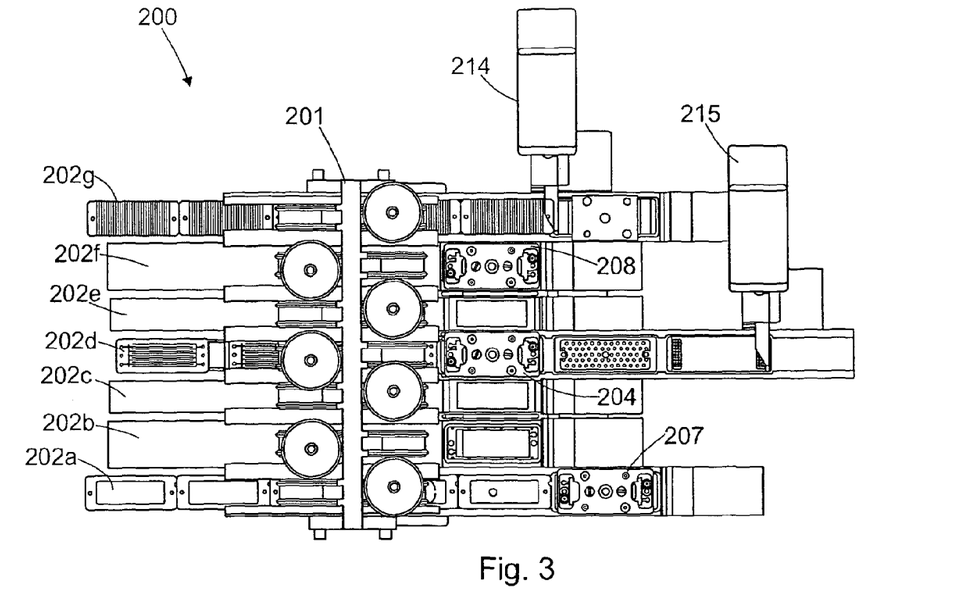
FIG. 3 is a plan view of the apparatus of FIG. 2.
Figure 4:
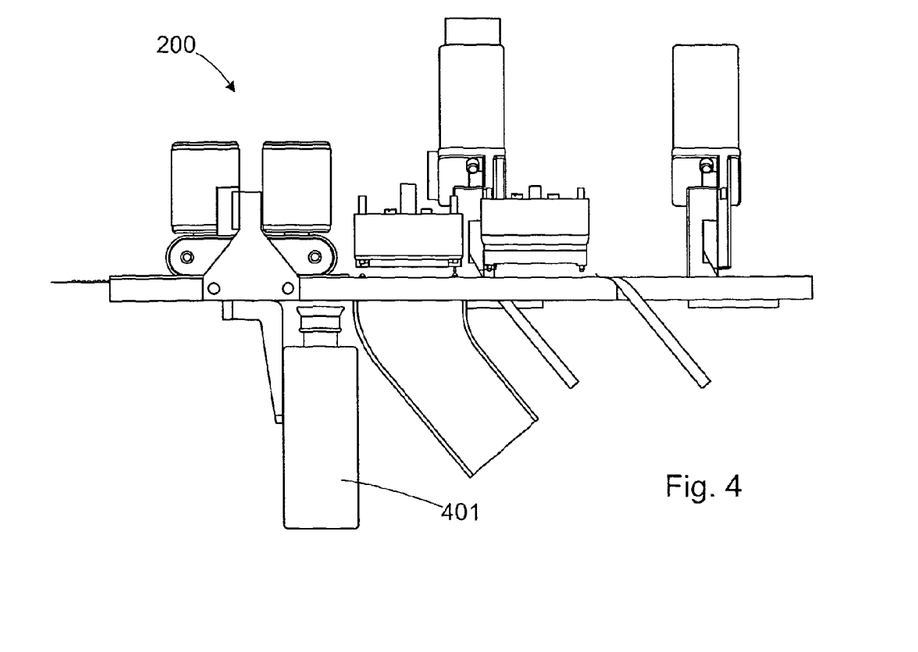
FIG. 4 is a side elevation view of the apparatus of FIGS. 2 and 3.

A perspective view of an exemplary apparatus 200 is illustrated in FIG. 2. The apparatus 200 is also shown in plan view in FIG. 3 and in side elevation view in FIG. 4. A number of sheet feeding lines 201a-g are provided to feed a corresponding number of sheet materials 202a-g. In the embodiment shown, a total of seven feed lines are provided, configured to feed a linked series of MEAs 202a, two adhesive gasket sheet materials 202b, 202f, two gas diffusion layer materials 202c, 202e, a series of linked anode electrode plates 202d and a series of linked cathode electrode plates 202g. The materials for the gasket and gas diffusion layer lines 201b, 201c, 201e, 201f are provided in raw form, i.e. with only a defined sheet thickness and width, whereas the materials for the anode and cathode electrode plates 202d, 202g are provided in a pre-prepared form with surface features such as fluid flow channels already in place, which may for example have been formed by stamping and/or etching. To allow the anode and cathode plates to be indexed through the assembly 200, successive plates are connected to each other, although these plates may alternatively be fed from a hopper comprising stacks of such parts. The gasket and gas diffusion materials may be supplied from reel or sheet fed stock. The gasket material may be supplied in the form of an adhesive sheet with a backing paper on one or both sides, while the gas diffusion layer material may be applied without any adhesive layer.

The MEA line 201a is provided with ready-made membrane-electrode assemblies, which in the embodiment shown are linked together for indexing and require only a final cut to trim and divide the individual MEA components before assembly. The MEAs can also be provided either as a reel fed sheet or as individual parts from a sheet feeder. For each feed line, it is advantageous for the assembly 200 to be provided with material in the form of a sheet or a series of linked components, because this reduces the complexity of the assembly.

The anode plates 202d are indexed by the feed line 201d towards a first intermediate laminating, or assembly, station 203, where the gasket, gas diffusion layer and membrane electrode assembly components are laminated to each anode plate. For this purpose, a multi-functional assembly head 204 is provided. The assembly head 204 is traversable across the feed lines along one or more axes by means of a pick-and-place mechanism (not shown, for clarity). In some exemplars, the assembly head 204 is translatable along the x-axis (shown in FIG. 2), which is in a direction along the plane of the feed lines and transverse to the direction the feed lines are configured to provide the sheet materials, and can be raised and lowered in the z-axis, i.e. in a direction orthogonal to the plane of the feed lines.

An exemplary series of operations leading to assembly comprising an anode plate with a gas diffusion layer and an adhesive gasket proceeds as follows.

An anode plate is first advanced to the assembly station 203. The anode plate may be accurately located at the assembly station 203 by being located with one or more pins in the assembly station engaging with corresponding holes in the anode plate. The assembly head 204 translates to a first die 205 at a location on the gasket feed line 201b. A punch in the assembly head then engages with the die across the gasket material 202b, cutting out a gasket-shaped piece from the sheet. The punch is provided with a series of openings through which a vacuum is applied, so that the gasket is held on to the assembly head 204. The assembly head then retracts from the die 205 and translates to a second die 206, over which the gas diffusion layer material is provided.

With the gasket material still in place on the assembly head, a second punch in the assembly head is engaged with the second die across the gas diffusion layer material, cutting out a portion of the material that is surrounded by the existing gasket material. The assembly head 204 then retracts from the second die 206 and translates across to the assembly station 203, carrying both the gasket and gas diffusion layer portions. In a single operation, the assembly head then applies the gasket and gas diffusion layers to the anode plate in position at the assembly station 203. Because the gas diffusion layer fits entirely within the gasket layer, the gas diffusion layer is held laterally in place once it has been applied to the anode plate. No adhesive is therefore required on the gas diffusion layer, although at least a partial adhesive layer may be provided to ensure that the layer does not shift during subsequent steps.

Once the gasket and gas diffusion layer have been applied, an MEA layer is applied over the anode plate. This may be done by translating the assembly head 204, which may comprise a third punch for cutting out and holding on to an MEA component, or alternatively may be carried out by using a second assembly head 207 specifically for the purpose of cutting and translating the MEA components to the assembly station 203.

In the first alternative mentioned above, a second assembly head 208, nominally identical to the first assembly head 204, may be provided to obtain gasket and gas diffusion layer portions from respective dies 209, 210, fed by sheet feed lines 201g, 201f. This second assembly head 208 can therefore be used to speed up the overall process by carrying out other operations in parallel while the first assembly head is retrieving the MEA from the MEA station 211.

In the second alternative, the first assembly head 204 may be used to obtain gasket and gas diffusion layer portions from dies 209, 210 while the second assembly head 207 is used to obtain the MEA. In this alternative, the MEA station 211 is preferably offset from the assembly station 203, so that any conflict between movement of the second assembly head 207 and the first assembly head 204 is avoided. The second assembly head 207 is configured to translate between the MEA assembly station 211 and the first assembly station 203 for transferring an MEA component to the anode plate.

In each of the first and second alternatives, some operations are carried out in parallel, and the overall assembly process can therefore be quicker than with the use of only one assembly head. The use of a separate assembly head specifically for the transfer of the MEA layer also reduces the complexity of design of the assembly head 204, as this is only required to carry out two cutting processes rather than three.

Once the anode plate has been provided with the required gaskets, gas diffusion layers and MEA, the anode plate feed line 201d is indexed to move the anode plate to a second assembly station 212. A third assembly head 213, in position over a cathode plate fed by the cathode plate feed line 201g, then lifts a cathode plate from the cathode sheet material 202g and translates the cathode plate over to the second assembly station 212. A cropping blade actuator 214 is operated to divide the cathode plate from the sheet-fed line.

Once the cathode plate is applied at the second assembly station 212, the anode feed line indexes the finished fuel cell assembly to a third assembly station 217 and a further cropping blade actuator 215 is operated twice in successive indexing steps, to divide the assembled fuel cell from the anode feed line 202d. The assembled fuel cell is then passed to an assembly chute 216 for further assembly. The third assembly station 217 is preferably provided with a vacuum bed for holding the fuel cell assembly in position during the cropping operations.

For each of the assembly heads described above, a vacuum system is preferably used to retain components between a punching step and a lamination step at the assembly stations 203, 212. Further details of the assembly head 204 are described below.

Also shown in FIG. 1 are various waste chutes 218-223, along which scrap material from feed lines 201a-c,e-g is fed after cutting operations to divide the various components from the sheet fed lines.

One or more cameras 401 (FIG. 4) may be provided below the sheet feeding assembly 201 to allow for the relative position of the components to be monitored during assembly. The camera 401 may for example be used to ensure that edges of the gasket and gas diffusion layer materials are in a correct position over the respective dies. A camera may also be used to monitor and, if necessary, adjust the position of the anode or cathode lines.

Figure 5:
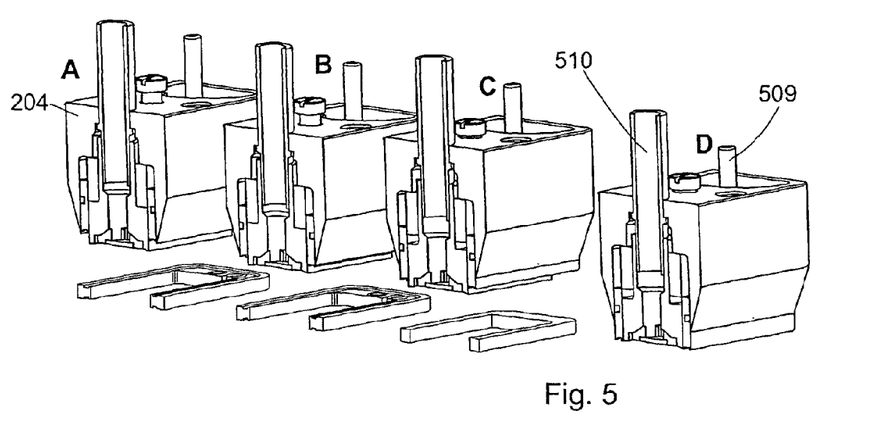
FIGS. 5 and 6 comprise a series of cut-away perspective views of an exemplary assembly head for the apparatus of FIGS. 2-4.
Figure 6:
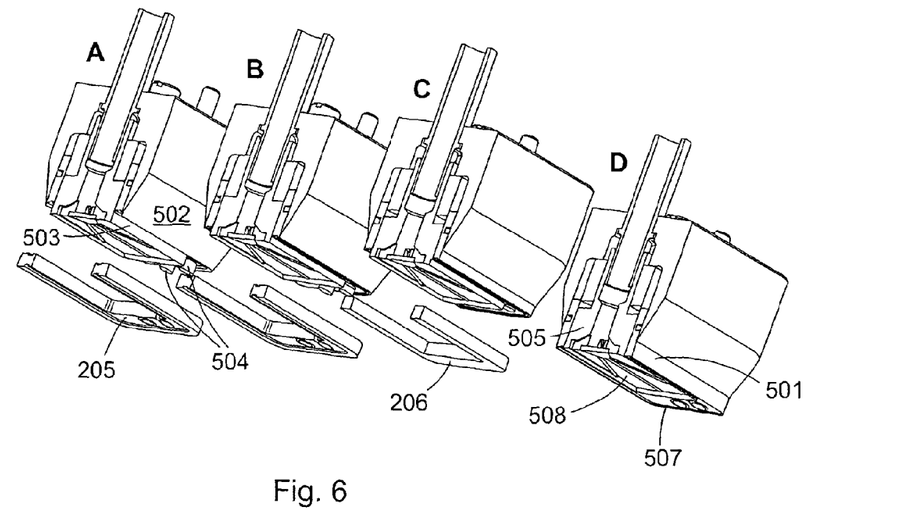

FIGS. 5 and 6 show different perspective cut-away views of an exemplary assembly head 204 in different configurations for cutting and translating gasket and gas diffusion layer sheet materials. In parts A and B of FIGS. 5a and 6a, the assembly head is in a configuration adjacent a gasket die 205, with a first punch comprising an outer edge 502, an inner edge 503 and further features 504 configured to provide fluid flow channels in the gasket material on engagement with the gasket die 205. When the first punch contacts the die 205, outer and inner profiles of a gasket are simultaneously formed by the inner edge 503, outer edge 502 and further features 504, which results in waste material that is ejected. A vacuum holder 501 is provided between the inner and outer edges 504, 502 in order to retain the gasket on a surface 507 of the punch after this punching operation. After engagement with the gasket die 205, the first punch is retracted and a second punch 505, comprising an outer edge 503 common with the inner edge of the first punch 501, is extended and is engaged with the gas diffusion layer die 206 (part C). After both sheet materials have been divided, the surfaces 507, 508 of the respective first and second punches 501, 505 are aligned with each other and the sheet materials (not shown) that are held in place on the surfaces 507, 508 are applied to the anode plate at the assembly station 203 (FIG. 2), as shown in part D of FIGS. 5 and 6.

FIGS. 5 and 6 also illustrate vacuum lines 509, 510 provided on the assembly head 204, which provide suction to openings provided on the surfaces 507, 508 of the first and second punches 501, 505 for keeping the sheet materials in place during translation to the assembly station 203. A first vacuum line 509 provides suction for the surface 507 of the first punch 501, while a second vacuum line 510 provides suction for the surface 508 of the second punch 505.

Figure 7:
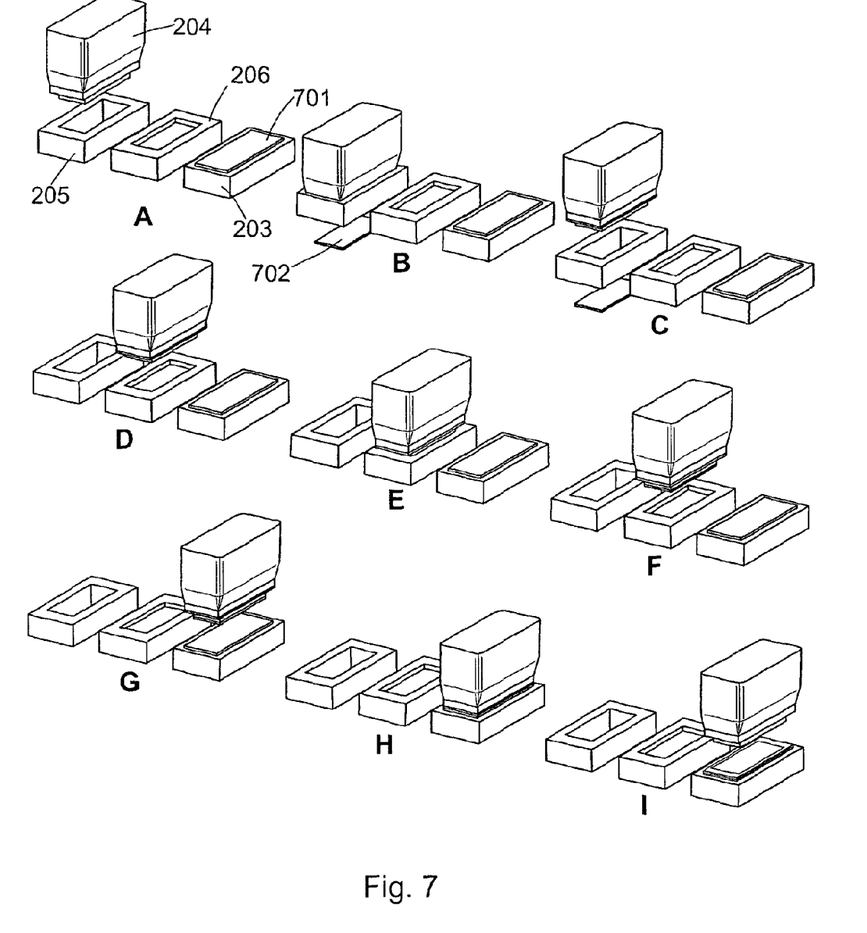
FIG. 7 comprises a series of schematic diagrams illustrating a series of processing steps in assembling a laminated fuel cell assembly.

FIG. 7 illustrates schematically a series of steps in an exemplary process for transferring a gasket and a gas diffusion layer from respective dies 205, 206 to an assembly station 203 on which is provided an anode plate 701. In step A, the assembly head is in position over the gasket die. A gasket material is provided over the die, and the assembly head engages the first punch 501 (FIGS. 5, 6) with the gasket die 205 (step B). A portion 702 of the gasket material is ejected through the gasket die 205 in the process, and is discarded. The assembly head 204 then retracts from the gasket die 205 (step C), and translates over to the gas diffusion layer die 206 (step D). The assembly head 204 then engages the second punch with the gas diffusion layer die 206 (step E), and retracts from the gas diffusion layer die 206, with both the gasket and gas diffusion layer portions attached to the respective surfaces of the first and second punches. The assembly head 204 then translates over to the assembly station 203 (step G), and applies the gasket and gas diffusion layer portions to the anode plate 701 (step H). The assembly head 204 then retracts from the assembly station (step I), taking a backing paper away from the upper surface of the gasket material. The backing paper is then discarded by translating to the assembly head 204 to a waste material chute or hopper and releasing the vacuum applied to the surface of the first punch, and optionally applying a positive pressure to ensure the backing paper is cleared and any residual material is ejected.

In subsequent processing steps, the MEA is applied over the anode plate 701. A further gasket and gas diffusion layer is then applied, following the steps as shown in FIG. 7. A cathode plate is then applied to complete the fuel cell assembly.

The assembly head 204 is preferably configured such that the above operations can be carried out using a pick and place arm able to move the head along at least two linear axes. The head may be further configured to include an additional rotation axis so that additional processes could be accommodated.

In the exemplars described above, separate feed lines 201$b$, 201$f$ are provided for the two gasket materials 202$b$, 202$f$, to accommodate different shapes and configurations of gaskets on the anode and cathode sides. Similarly, separate feed lines 201$c$, 201$e$ are provided for the two gas diffusion layer materials 202$c$, 202$e$ so that different shapes and materials can be used for the anode and cathode sides. These lines could be simplified by consolidating the gasket lines into one common line and/or the gas diffusion lines into one common line, which would further simplify the process and the associated inventory requirements.

While the method and apparatus have been described in terms of what are presently considered to be the most practical and preferred implementation, exemplars and/or embodiments, it is to be understood that the disclosure need not be limited to the disclosed implementation, exemplars and/or embodiments. It is intended to cover various modifications and similar arrangements included within the spirit and scope of the claims, the scope of which should be accorded the broadest interpretation so as to encompass all such modifications and similar structures.

It should also be understood that a variety of changes may be made without departing from the essence of the invention. Such changes are also implicitly included in the description. They still fall within the scope of this disclosure. It should be understood that this disclosure is intended to yield a patent covering numerous aspects both independently and as an overall system and in both method and apparatus modes.

Further, each of the various elements of the disclosure, exemplars, aspects thereof and claims may also be achieved in a variety of manners. This disclosure should be understood to encompass each such variation, be it a variation of any apparatus, a method or process, or even merely a variation of any element of these.

Particularly, it should be understood that as the disclosure relates to elements claimed, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application or thereafter are hereby appended and hereby incorporated by reference; however, as to each of the above, to the extent that such information or statements incorporated by reference might be considered inconsistent with the patenting of claimed invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The Abstract is provided to comply with 37 CFR §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of assembling a laminated fuel cell, the method comprising the steps of:
   providing a first sheet material to a first die;
   translating an assembly head to a first location adjacent the first die, the assembly head comprising a first punch having a surface configured to engage with the first die;
   engaging the first punch with the first die to divide a portion from the first sheet material;
   adhering the first sheet portion to the surface of the first punch;
   translating the assembly head with the first sheet material portion to an assembly station comprising an electrode plate; and
   applying the first sheet material portion to a surface of the electrode plate;
   wherein the assembly head further comprises a second punch having a surface configured to engage a second die, the method further comprising:
      providing a second sheet material to the second die;
      translating the assembly head to a second location adjacent the second die;
      engaging the second punch with the second die to divide a portion from the second sheet material;
      translating the assembly head with the second sheet material portion to the assembly station; and,
      applying the second sheet material portion to the surface of the electrode plate;
   wherein an outer perimeter of the surface of the second punch lies entirely within an inner perimeter of the surface of the first punch.

2. A method of assembling a laminated fuel cell, the method comprising the steps of:
   providing a first sheet material to a first die;
   translating an assembly head to a first location adjacent the first die, the assembly head comprising a first punch having a surface configured to engage with the first die;
   engaging the first punch with the first die to divide a portion from the first sheet material;
   adhering the first sheet portion to the surface of the first punch;
   translating the assembly head with the first sheet material portion to an assembly station comprising an electrode plate; and
   applying the first sheet material portion to a surface of the electrode plate;
   wherein the assembly head further comprises a second punch having a surface configured to engage a second die, the method further comprising:
      providing a second sheet material to the second die;
      translating the assembly head to a second location adjacent the second die;
      engaging the second punch with the second die to divide a portion from the second sheet material;
      translating the assembly head with the second sheet material portion to the assembly station; and,
      applying the second sheet material portion to the surface of the electrode plate;
   wherein an outer perimeter of the surface of the second punch lies entirely within an inner perimeter of the surface of the first punch;
   wherein the first sheet material comprises an adhesive gasket material and the second sheet material comprises a porous gas diffusion layer material.

3. A method of assembling a laminated fuel cell, the method comprising the steps of:
   providing a first sheet material to a first die;
   translating a first assembly head to a first location adjacent the first die, the first assembly head comprising a first punch having a surface configured to engage with the first die;
   engaging the first punch with the first die to divide a portion from the first sheet material;
   adhering the first sheet portion to the surface of the first punch;
   translating the first assembly head with the first sheet material portion to an assembly station comprising an electrode plate; and
   applying the first sheet material portion to a surface of the electrode plate;
   wherein the first assembly head further comprises a second punch having a surface configured to engage a second die, the method further comprising:
      providing a second sheet material to the second die;
      translating the first assembly head to a second location adjacent the second die;
      engaging the second punch with the second die to divide a portion from the second sheet material;
      translating the assembly head with the second sheet material portion to the assembly station; and,
      applying the second sheet material portion to the surface of the electrode plate;
   providing a third sheet material to a third die;
   translating a second assembly head to a third location adjacent a third die, the second assembly head comprising a first punch having a surface configured to engage with the third die;
   engaging the first punch of the second assembly head with the third die to divide a portion from the third sheet material;
   adhering the third sheet portion to the surface of the first punch of the second assembly head;
   translating the second assembly head with the third sheet material portion to the assembly station; and,
   applying the third sheet material portion over the first and second sheet material portions.

4. The method of claim 3 wherein the third sheet portion is adhered to the surface of the first punch of the second assembly head by a vacuum applied to openings in the surface of the first punch of the second assembly head.

5. The method of claim 3 wherein the second assembly head comprises a second punch having a surface configured to engage a fourth die, the method comprising:
   providing a fourth sheet material to the fourth die;
   translating the second assembly head to a fourth location adjacent the fourth die;
   engaging the second punch of the second assembly head with the fourth die to divide a portion from the fourth sheet material;
   translating the second assembly head with the fourth sheet material portion to the assembly station; and,
   applying the fourth sheet material portion over the first and second sheet material portions.

6. The method of claim 5 wherein the fourth sheet portion is adhered to the surface of the second punch of the second assembly head by a vacuum applied to openings in the surface of the second punch of the second assembly head.

7. The method of claim 5 wherein the second assembly head is translated from the fourth location to the assembly station with both the third and fourth sheet material portions adhered to respective surfaces of the first and second punches of the second assembly head, and wherein the third and fourth sheet material portions are applied over the first and second sheet material portions in a single operation.

8. The method of claim 5, wherein the first assembly head further comprises a third punch configured to engage a fifth die at a fifth location, the method further comprising:
- providing a fifth sheet material to the fifth die;
- translating the first assembly head to the fifth location;
- engaging the third punch with the fifth die to divide a portion from the fifth sheet material;
- translating the first assembly head with the fifth sheet material portion to the assembly station; and,
- applying the fifth sheet material portion over the first and second sheet material portions.

9. The method of claim 8 wherein the fifth sheet material portion forms a membrane electrode assembly for the fuel cell assembly.

\* \* \* \* \*